March 23, 1948. L. J. GORDON 2,438,337
COMBINATION RULE AND COMPASS
Filed Sept. 27, 1944
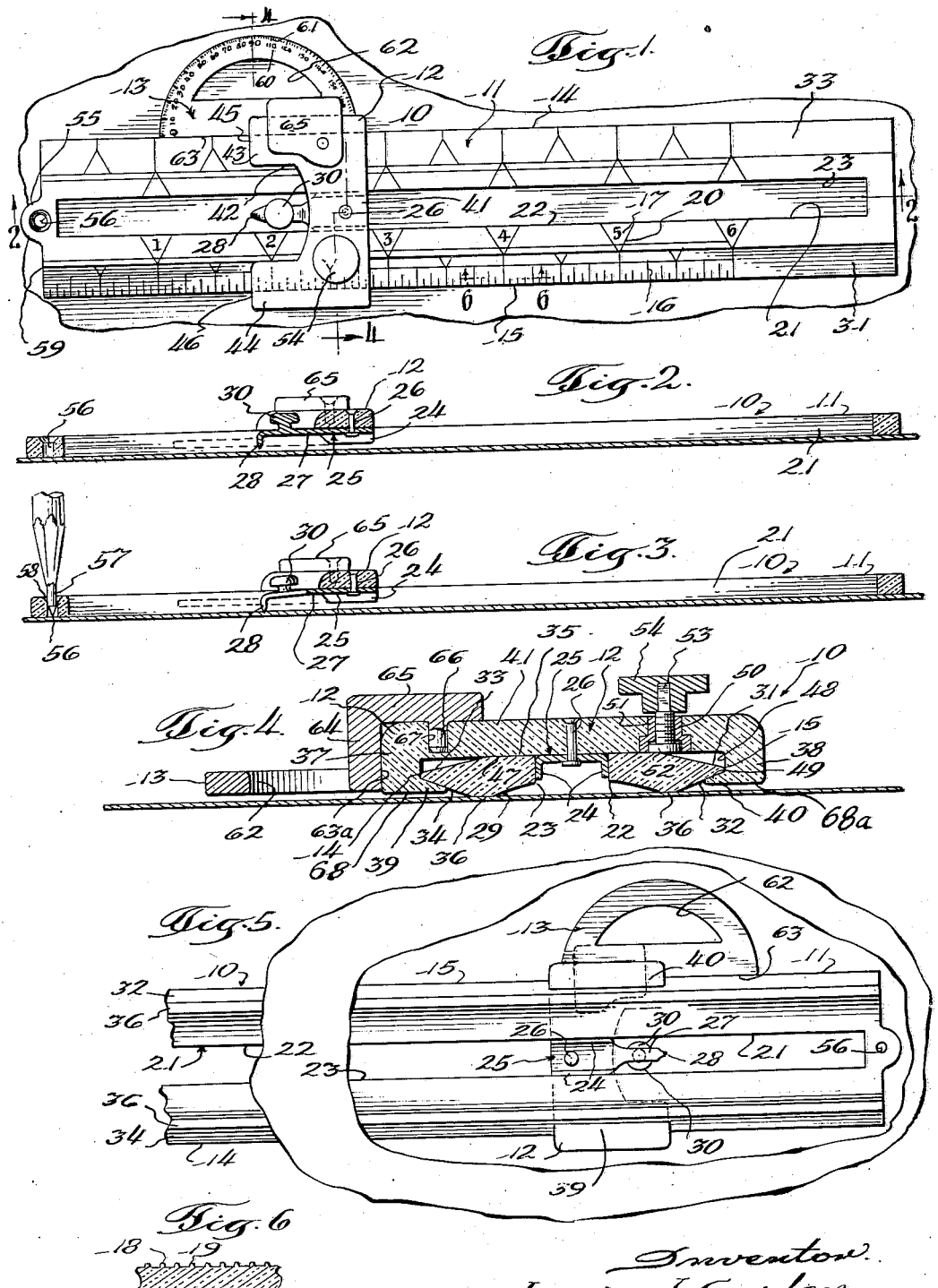
Inventor
Louis J. Gordon
By McCaleb, Wendt & Dickinson
Attorneys Patented Mar. 23, 1948

2,438,337

UNITED STATES PATENT OFFICE 2,438,337

COMBINATION RULE AND COMPASS

Louis J. Gordon, Chicago, Ill.

Application September 27, 1944, Serial No. 555,905

8 Claims. (Cl. 33—27)

The present invention relates to scales or rulers, and is particularly concerned with improvements in scales of the type covered by my prior application, Ser. No. 474,246 on Scales, filed February 1, 1943 which matured into Patent No. 2,400,407, dated May 14, 1946.

One of the features of the scale of my prior application was a scale including a slider provided with a sharply pointed projection adapted to serve as a center of rotation when the scale is to be used in drawing circles; and according to my prior application, the pointed center projection was fixedly mounted upon the slider.

One of the disadvantages of this particular construction is that the point tends to enter into and penetrate the drawing board or drawing or other work to which the scale or ruler is applied, unless the slider is moved off to one side.

One of the objects of the present invention is the provision of an improved scale having a slider of the type provided with such a center projection, in which the point is automatically withdrawn from the plane of the bottom of the scale when it is released or when it is not being used for the purpose of drawing circles.

Another object of the invention is the provision of a scale of the class described having a slider provided with a center point in which the center point is normally held in an elevated position by means of a resilient spring mounting so that it can be depressed manually whenever it is to be used as a center point, but at all other times the projection is in such position that it will not engage the paper or other work with which the ruler is applied.

Another object of the invention is the provision of a scale of the class described which is provided with suitable raised indicia and scale divisions so that it may be used by the blind, and readings may be made merely by touch.

Another object of the invention is the provision of an improved scale of the class described which gives a maximum visibility of the work at the time when the scale is being applied to the work and in which the center point is so arranged as to permit maximum visibility.

Another object of the invention is the provision of an improved scale which is provided with a removable protractor so arranged that its horizontal axis is located along the line of the adjacent edge of the scale used as a base line.

Another object of the invention is the provision of an improved scale of the class described which is simple, durable, capable of economical manufacture, and which utilizes a minimum amount of metal or other materials the supply of which is critical at the present time.

Other objects and advantages of the invention will be apparent from the following description and the accompanying drawings, in which similar characters of reference indicate similar parts throughout the several views, Referring to the single sheet of drawings, Fig. 1 is a top plan view of a scale embodying my invention;

Fig. 2 is a vertical sectional view, taken on the plane of the line 2—2 of Fig. 1, looking in the direction of the arrows;

Fig. 3 is a view similar to Fig. 2, showing the appearance of the device at a time when it is being used for drawing a circle;

Fig. 4 is a transverse sectional view, taken on the plane of the line 4—4 of Fig. 1, looking in the direction of the arrows;

Fig. 5 is a fragmentary bottom plan view of the scale;

Fig. 6 is a fragmentary sectional view, taken on the plane of the line 6—6 of Fig. 1, looking in the direction of the arrows, showing the raised scale divisions, which are exemplary of the indicia and division markings by means of which the scale may be used by the blind.

Referring to Figs. 1 to 3, 10 indicates in its entirety my improved scale, which preferably comprises the ruler member 11, slider 12, and protractor 13.

The present scale preferably has all of its parts, which may be so constructed, made of a nonmetallic heat moldable plastic that is hard and indestructible, but is transparent and permits a maximum visibility of the work to which it is being applied. I desire it to be understood, however, that in some embodiments of the invention other suitable materials, such as steel, or even wood, may be employed.

The ruler member 11 preferably consists of a substantially rectangular strip of material, which is provided with straight edges 14, 15, one or both of which are provided with the scale divisions 16 and suitable indicia 17.

While the scale divisions and indicia are indicated by means of single lines, I desire it to be understood that these divisions and indicia are preferably also in the form of raised ridges 18 (Fig. 6), the marking being upon the upper surface 19 of these ridges, which are preferably of substantially rectangular cross-section.

The use of the forked lines and ridges 20 (Fig. 1) for the indicia also serves to guide the user to these identifying divisions without sight.

The body of the ruler 11 is preferably formed with a substantially rectangular centrally located slot 21 extending from a point near one end to a point adjacent the other end of the ruler, and adapted to serve as guides for the slider 12. Slot 21 preferably has the plane sides 22, 23 for flat engagement with the depending flanges 24 on a slider aligning member 25 (Fig. 4).

The member 25 may consist of a channelled member of suitable resilient metal, such as spring brass or steel, which is of such proportions that its side flanges 24 slidably engage the sides 22, 23 of the slot 21.

The web of this channelled member may be secured to the slider 12 by means of a through rivet 26. The flanges 24, 24 are preferably of substantial length so that they engage a suitable length of the walls 22, 23 of the slot 21.

The aligning member 25 is provided with an axially projecting spring arm 27 having a depending, sharply pointed projection 28 adapted to serve as the center of rotation when the scale is used for drawing a circle. The sharply pointed center projection 28 comprises a downwardly turned and conically pointed extension of the resilient arm 27, and the end of this point 28 is normally above the lower plane 29 of the ruler member 11.

Thus the point is housed within the slot 21, and ordinarily the ruler may be applied to the work without having the point touch or mar any work with which the ruler is used. This is a marked advantage over the devices of the prior art, such as that exemplified in my prior application, in which the point permanently projects from the slider below the lower plane of the ruler.

The spring arm 27 is preferably provided with a finger button 30, comprising a small, round button, which may be riveted or otherwise secured to the spring arm 27, and which may be conveniently engaged by the finger to depress the point 28 into engagement with the paper, as shown in Fig. 3, when the ruler is used for drawing circles.

When the finger is withdrawn from the button 30 in Fig. 3, the spring arm 27 will immediately withdraw the point to the position of Fig. 2.

The upper and lower corners at the straight edges of the ruler 11 are preferably beveled off at 31, 32, 33, and 34, leaving a relatively narrow plane surface at these straight edges 14, 15. This spaces the straight edges 14, 15 from the paper so that any ink which might get on the ruler during the drawing of ink lines will, nevertheless, be kept out of contact with the paper. It also eliminates tendencies toward errors in the holding of the pen or pencil during the drawing of straight lines.

Inside the beveled edges of the corner portions 31 to 34 the ruler 11 preferably has a plane upper surface 35 and plane lower surfaces 36, the lower surfaces flatly engaging the paper or other work, and the upper surface 35 being engaged by the slider 12.

Between the lower plane surfaces 36, the bottom of the ruler 11 is preferably concavely curved according to a portion of the surface of a cylinder so that the transparent ruler is adapted to act like a magnifying glass for facilitating the reading of fine print, detail, etc.

The beveled surfaces 31 and 33 also serve to support the raised indicia 16, 17, 18, 19, 20 out of contact with the lower portion of the slider, which may have a plane lower surface 47.

The slider 12 is also preferably constructed of the same transparent plastic material, and it preferably comprises a substantially flat body member of sufficient width to extend across the top of the scale so that its depending flanges 37, 38 may extend downwardly past the edges 14, 15 of the scale and may be provided with beveled retaining flanges 39, 40 engaging the lower beveled surfaces 32, 34.

The body portion 41 of the slider 12 may be substantially the shape of a capital letter C drawn in a rectangular style so that there is a centrally located opening 42 between the leg portions 43, 44 of the slider.

The resilient arm 27 projects into this centrally located opening 42 of the slider so that there is a maximum visibility about the center point 28, which is preferably located midway between the edges 14, 15 of the ruler. The legs 43, 44 preferably have straight edges 45, 46 extending transversely of the scale and carried by the slider, and these edges of the slider serve as straight lines for reading the scale divisions and indicia at which the slider is located.

The center point 28 is located so that it is in the straight line connecting the slider edges 45, 46 so that the user may readily determine the longitudinal numeral location of the center point on the scale.

The retaining flanges 39, 40 of the slider preferably have their lower surfaces 68 and 68a so spaced from the plane of the paper that it is located above the lower plane surfaces 36 on the ruler in order that the slider can be moved backward and forward freely while the ruler is engaging the paper.

The slider 12 has its depending flanges 38 formed with the grooves 48 for receiving the edges of the ruler by which the slider is guided, and these grooves 48 are preferably rectangular in shape at the upper corner, but have the lower beveled surface 49 for engaging a corresponding beveled surface on the retaining flanges 39, 40.

In order to retain the slider in predetermined adjusted position, it is preferably provided with a threaded clamping member comprising a threaded member 50 of suitable metal, which is threaded into a sleeve 51 that is anchored in the slider, and the threaded member 50 has a head 52 which engages the ruler.

The upper end of threaded member 50 has a non-circular shank 53, which is anchored in a circular knob 54 by means of which the threaded member 50 may be turned to drive the clamping member 52 into clamping engagement with the ruler 11.

One end of the ruler 11 is preferably provided with a partially circular formation 55 located at the end of the slot 21.

This circular formation is provided with a circular aperture 56 of sufficient size to receive the lead of a pencil, and the pencil is preferably so pointed that a cylindrical portion of the lead 57 projects therefrom to be located in the cylindrical bore 56, the upper part of the bore 56 communicating with a frusto-conical bore 58.

The center of the aperture 56 is located on a line with the straight end 59 of the scale and also along the center line of the scale in alignment with the center point 28. Thus the slider may be located at any certain indicia, and the center point will be spaced from the center of the pencil or the point of the pencil by an amount indicated on the scale.

The slider is also preferably provided with a protractor 13, which may consist of a half circular member of similar material, provided with angular indicia, and scale divisions 60, 61 also raised in character, for convenient reading without sight.

The protractor may have a hollow or cut-out center portion 62, and it is provided at its lower edge with a straight edge portion 63 for engaging the edge 14 of the ruler 11 and an offset straight edge portion 63a which engages the edge of the slider, the latter being best illustrated in Fig. 4. The protractor also preferably has an upwardly extending supporting flange 64, a horizontally extending flange 65, and a depending pin 66 which fits in a bore 67 in the slider.

The single pin 66 fitting in the bore 67 of the slider holds the protractor in fixed position on the slider. In this position the lower straight edge portion 63 of the protractor is in alignment with the upper edge 14 of the ruler and the upper edge of the ruler may be used as a base line for the protractor.

The protractor 13 may be removed by merely lifting the pin 66 out of its socket 67.

The present ruler may be used for making all kinds of measurements and drawings, and may be used to describe circles having a radius equal to the length of the ruler, without removing the ruler from the paper. In drawing circles a pencil is inserted into the aperture 56, as shown in Fig. 3, and the slider 12 is moved to the desired radius and clamped by means of threaded member 50. Then a finger is applied to the button 30, and the point 28 is pressed into the paper to serve as a center, after which arcs or whole circles may be drawn by means of the pencil 57.

If desired, the present slider and ruler may be provided with suitable inside and outside caliper members, as shown in my prior application. The present ruler is of great utility in all kinds of designing and drawing. Due to the transparency of the material, the work under the ruler is always visible, and the center point for drawing circles is also arranged in the slot 21 so as to give maximum visibility.

The raised indicia and scale divisions permit the ruler to be used without sight; and due to the many different operations that can be carried out by this ruler, work can be done in a much shorter time than can be accomplished with the dividers, compasses, rulers, etc. of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a scale, the combination of a ruler comprising a supporting body provided with upper and lower straight edges substantially parallel to each other and with the lower longitudinal corners of said body beveled upwardly, a slider mounted on said body and having flanges extending over the side edges and securing flanges extending under the beveled portions of the body, the said slider having its lower surfaces spaced above the plane contacted by the lower side of the ruler whereby the slider may be caused to move freely when the ruler is resting upon the work.

2. In a scale, the combination of a ruler comprising a supporting body provided with upper and lower straight edges substantially parallel to each other and with the lower longitudinal corners of said body beveled upwardly, a C-shaped slider mounted on said body and having flanges extending over the side edges and securing flanges extending under the beveled portions of the body, the said slider having its lower surfaces spaced above the plane contacted by the lower side of the ruler whereby the slider may be caused to move freely when the ruler is resting upon the work, said ruler being provided at one end with an aperture for a pencil, said aperture having its center in alignment with the end indicia of the ruler, and said slider being provided with a resiliently supported center point, and said center point comprising a resilient projecting member centrally located in said C-shaped slider and having a downwardly turned sharply pointed extension and a finger button located on the top surface of said resilient projecting member.

3. In a scale, the combination of a ruler comprising a supporting body provided with upper and lower straight edges substantially parallel to each other and with the lower longitudinal corners of said body beveled upwardly, a slider mounted on said body and having flanges extending over the side edges and securing flanges extending under the beveled portions of the body, the said slider having its lower surfaces spaced above the plane contacted by the lower side of the ruler whereby the slider may be caused to move freely when the ruler is resting upon the work, said ruler being provided at one end with an aperture for a pencil, said aperture having its center in alignment with the end indicia of the ruler, and said slider being provided with a resiliently supported center point, said center point being located to project through a slot, said slot extending longitudinally and centrally of said ruler, and said center point being in longitudinal alignment with said aperture.

4. In a scale, the combination of a ruler comprising a supporting body provided with upper and lower straight edges substantially parallel to each other and with the lower longitudinal corners of said body beveled upwardly, a slider mounted on said body and having flanges extending over the side edges and securing flanges extending under the beveled portions of the body, the said slider having its lower surfaces spaced above the plane contacted by the lower side of the ruler whereby the slider may be caused to move freely when the ruler is resting upon the work, said ruler being provided at one end with an aperture for a pencil, said aperture having its center in alignment with the end indicia of the ruler, and said slider being provided with a resiliently supported center point, said center point being located to project through a slot, said slot extending longitudinally and centrally of said ruler, and said center point being in longitudinal alignment with said aperture, said resiliently supported center point being biased to a position in which it is housed in said slot out of contact with the work on which the ruler rests.

5. In a scale, the combination of a ruler comprising a supporting body provided with upper and lower straight edges substantially parallel to each other and with the lower longitudinal corners of said body beveled upwardly, a slider mounted on said body and having flanges extending over the side edges and securing flanges extending under the beveled portions of the body, the said slider having its lower surfaces spaced above the plane contacted by the lower side of the ruler whereby the slider may be caused to move freely when the ruler is resting upon the work, said ruler being provided at one end with an aperture for a pencil, said aperture having its center in alignment with the end indicia of the ruler, and said slider being provided with a resiliently supported center point, said center point being located to project through a slot, said slot extending longitudinally and centrally of said ruler, and said center point being in longitudinal alignment with said aperture, said resiliently supported center point being biased to a position in which it is housed in said slot out of contact with the work on which the ruler rests, said center point being provided with a manual member for engagement with the fingers when the center point is depressed into engagement with the work.

6. In a scale, the combination of a ruler comprising a supporting body provided with upper and lower straight edges substantially parallel to each other and with the lower longitudinal corners of said body beveled upwardly, a C-shaped slider mounted on said body and having flanges extending over the side edges and securing flanges extending under the beveled portions of the body, the said slider having its lower surfaces spaced above the plane contacted by the lower side of the ruler whereby the slider may be caused to move freely when the ruler is resting upon the work, said ruler being provided at one end with an aperture for a pencil, said aperture having its center in alignment with the end indicia of the ruler, and said slider being provided with a resiliently supported center point, said center point being located to project through a slot, said slot extending longitudinally and centrally of said ruler, and said center point comprising a resilient projecting member centrally located in said C-shaped slider and having a downwardly turned sharply pointed extension and a finger button located on the top surface of said resilient projecting member.

7. In a scale, the combination of a ruler comprising a supporting body provided with upper and lower straight edges substantially parallel to each other and with the lower longitudinal corners of said body beveled upwardly, a C-shaped slider mounted on said body and having flanges extending over the side edges and securing flanges extending under the beveled portions of the body, the said slider having its lower surfaces spaced above the plane contacted by the lower side of the ruler whereby the slider may be caused to move freely when the ruler is resting upon the work, said ruler being provided at one end with an aperture for a pencil, said aperture having its center in alignment with the end indicia of the ruler, and said slider being provided with a resiliently supported center point, said center point being located to project through a slot, said slot extending longitudinally and centrally of said ruler, and said center point comprising a resilient projecting member centrally located in said C-shaped slider and having a downwardly turned sharply pointed extension, said center point being biased to a position in which it is housed in said slot out of contact with the work on which the ruler rests, said center point being provided with a manual member for engagement with the fingers when the center point is depressed into engagement with the work.

8. A scale comprising a ruler body provided with a straight edge and a central longitudinal slot of substantial width which has sides paralleling said straight edge and which terminates slightly short of each end of the ruler body, said ruler body also being provided with a through aperture located adjacent one end thereof for receiving a pencil point or the like, a slider mounted on said ruler body for straight line motion thereon, said slider being substantially C-shaped and comprising a slider body extending transversely across the aforesaid slot and a pair of spaced-apart arms projecting away from one side of said slider body on opposite sides of said slot, said slider body being provided on the side thereof remote from said arms with a straight edge at right angles with the ruler body straight edge, a depresser button carried by the slider between the arms thereof and between and in spaced relation to the sides of the ruler body slot, a center point carried with said depresser button and spring means by which said center point normally is biased to lie housed in said slot between the sides thereof, the tips of the slider arms and said center point being aligned transversely of the ruler body when said button is depressed.

LOUIS J. GORDON.

REFERENCES CITED

The following references are of record in the file of this patent:

UNITED STATES PATENTS

| Number | Name | Date |
|---|---|---|
| 45,535 | Taylor | Dec. 20, 1864 |
| 392,143 | Wright | Oct. 30, 1888 |
| 776,987 | Ferris | Dec. 6, 1904 |
| 854,325 | Belcher | May 21, 1907 |
| 1,182,638 | Carnahan | May 9, 1916 |
| 1,188,644 | Golden | June 27, 1916 |
| 1,366,800 | Hayden | Jan. 25, 1921 |
| 1,402,629 | Manly | Jan. 3, 1922 |
| 1,602,490 | Homan | Oct. 12, 1926 |
| 1,808,705 | Owen | June 2, 1931 |

FOREIGN PATENTS

| Number | Country | Date |
|---|---|---|
| 301,443 | Italy | 1932 |